Figure 1:
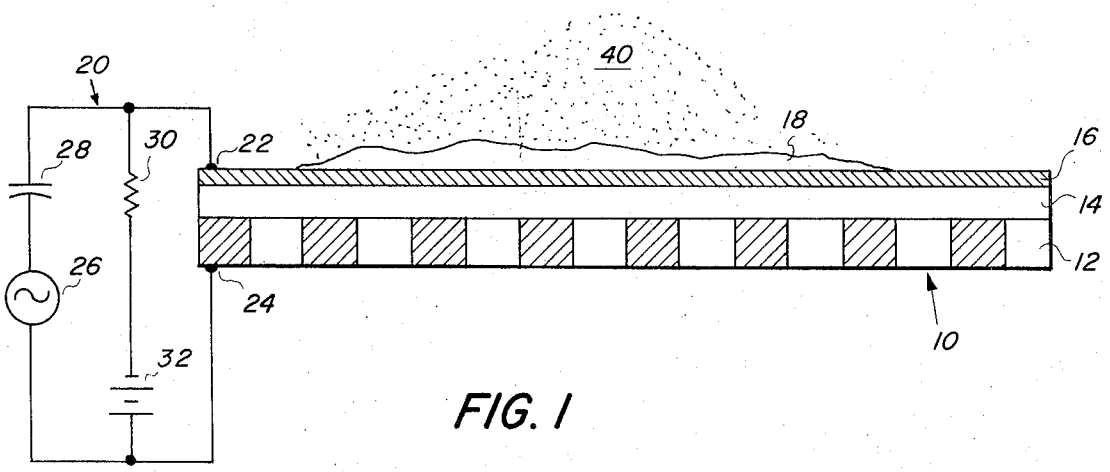

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 22, 1974

918 O.G. 1328

T918,010
VIBRATING-DIAPHRAGM POWDER-CLOUD GENERATOR

Theodore H. Morse, 4352 St. Paul Blvd., Rochester, N.Y. 14617

Filed Oct. 7, 1971, Ser. No. 187,267
**Int. Cl. G03g *13/08***
U.S. Cl. 118—627
1 Sheet Drawing. 13 Pages Specification

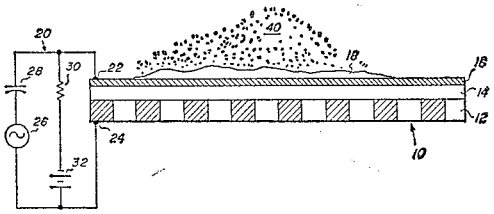

An apparatus for generating a powder cloud by vibration of a laminated diaphragm with an oscillating electrical signal. Toner particles contact or are supported on a multi-layer diaphragm which preferably comprises an uppermost thin coating of metal, e.g., aluminum, vacuum or otherwise deposited on an intermediate flexible plastic membrane which, in turn, is positioned over a perforated rigid conductive member. Toner particles deposited atop the coated membrane are physically propelled into a powder cloud above the diaphragm when an oscillating electrical signal from a power source is applied. This occurs because the oscillating signal causes the coated plastic membrane to cyclically and physically flex due to electrostatic attraction and relaxation between the two conductive layers. Linear combinations of a variety of applied electrical frequencies can be utilized to form "beats" or pulses which cause greater vibration excursions to aid in agitating the toner particles into a powder cloud.

VIBRATING-DIAPHRAGM POWDER-CLOUD GENERATOR

Filed Oct. 7, 1971

THEODORE H. MORSE
INVENTOR.

BY Robert W. Weig

ATTORNEY